United States Patent [19]

Saganovsky

[11] Patent Number: 5,061,884
[45] Date of Patent: Oct. 29, 1991

[54] CURRENT LIMITING CONTROL CIRCUIT FOR D.C. MOTORS WITH LINE DROPOUT PROTECTION

[75] Inventor: Abraham Saganovsky, Brooklyn, N.Y.

[73] Assignee: KB Electronics, Inc., Brooklyn, N.Y.

[21] Appl. No.: 478,665

[22] Filed: Feb. 12, 1990

[51] Int. Cl.[5] .............................................. H02P 1/18
[52] U.S. Cl. .................... 318/431; 318/479; 388/833
[58] Field of Search ............... 318/430, 431, 434, 436, 318/453, 478, 479, 778, 139; 388/822, 823, 833, 847, 854, 928.1

[56] References Cited

U.S. PATENT DOCUMENTS

| | | | |
|---|---|---|---|
| 3,222,586 | 12/1965 | Fontenote et al. | 388/822 |
| 3,670,237 | 6/1972 | Hubel et al. | 318/431 X |
| 3,745,439 | 7/1973 | Belmuth | 388/823 X |
| 3,849,710 | 11/1974 | Mason | 388/823 |
| 3,849,718 | 11/1974 | Forster et al. | 318/138 X |
| 3,958,164 | 5/1976 | Hess | 318/431 |
| 4,194,145 | 3/1980 | Ritter | 318/431 X |
| 4,196,462 | 4/1980 | Pohl | 318/430 X |
| 4,288,828 | 9/1981 | Kuntner et al. | 318/430 X |
| 4,541,029 | 9/1985 | Ohyama | 318/430 X |
| 4,764,713 | 8/1988 | D'Atre et al. | 318/778 |
| 4,839,570 | 6/1989 | Saganovsky | 388/815 |

FOREIGN PATENT DOCUMENTS

| | | | |
|---|---|---|---|
| 59-127582 | 7/1984 | Japan | 318/778 |
| 60-194770 | 10/1985 | Japan | 318/778 |
| 61-244292 | 10/1986 | Japan | 318/430 |
| 61-254090 | 11/1986 | Japan | 318/430 |

Primary Examiner—Bentsu Ro
Attorney, Agent, or Firm—Lieberman Rudolph & Nowak

[57] ABSTRACT

In accordance with a first embodiment of the invention, line dropout protection is provided for a d.c. motor wherein motor operation is prevented if power is applied at the time a main speed control device is not set in a zero position. Re-enabling motor operation is simply provided by resetting the motor speed control device to a zero position and reapplying power.

In accordance with the second embodiment of the invention, line dropout protection is provided for a d.c. motor wherein predetermined excess motor acceleration is prevented when power is applied to the d.c. motor. The instant invention prevents motor start-up under unexpected conditions, thereby clearly enhancing safety during operation of any device controlled by the d.c. motor.

3 Claims, 7 Drawing Sheets

CURRENT LIMITING CONTROL CIRCUIT FOR D.C. MOTORS WITH LINE DROPOUT PROTECTION

FIELD OF THE INVENTION

The present invention is directed to controlling the application of direct current to a reversible d.c. electric motor and, more particularly, to a circuit arrangement for producing current limit signals for control purposes, which circuit also advantageously provides line dropout protection.

BACKGROUND OF THE INVENTION

Conventional control circuits for d.c. motors are utilized in many different applications such as paper processing apparatus, loaders, trucks, exercise equipment such as treadmills, and the like. These known circuits usually employ silicon controlled rectifiers integrated in the motor electric supply circuit, and some device to produce a train of pulses arranged to effect periodic conduction of the rectifiers. In this manner, the motor is energized by pulses of direct current, and control of the duration of the pulses is utilized for motor control purposes such as speed of motor drive, and for compensation during various load conditions.

Such control circuits also are known to provide compensation for the effect of the internal resistance in the motor armature. One such control circuit is described in U.S. Pat. No. 4,839,570, ('570 patent), which patent is owned by the assignee of the instant invention. The invention described and claimed herein is an improvement to the invention described and claimed in the '570 patent.

The control circuit described in the '570 patent provides compensation for motor armature voltage loss by generating a sensing signal, indicative of the current through a sensing resistor, to sense the voltage drop across the armature of the controlled d.c. motor. The sensing signal is conducted to an amplifier whereat it is amplified and compared to a reference voltage to produce an error signal in accordance with current limiting need for the motor. This amplifier is dedicated solely to the current limiting function, and the amplified corrective signal is fed directly into a trigger circuit, which controls the d.c. power supply to the motor. It was the object of the invention in the '570 patent to control the current supply to a d.c. motor so that the circuit response time was extremely fast and its operative capability accurate and predictable.

This was accomplished by supplying a corrective signal to a d.c. motor for current limiting purposes in the shortest period of time, by producing the signal in a circuit dedicated solely for this purpose, and by directly feeding the signal into the power supply to the motor. The teachings of the '570 patent are specifically incorporated herein by reference.

Although the control circuit described and claimed in the '570 patent had many advantageous features, it failed to provide line dropout protection. Providing line dropout protection in a d.c. motor is an important consideration in many applications, where line dropout protection is defined as preventing motor restart unless the motor speed control is first returned to a zero setting. For example, in a piece of equipment such as an exercise treadmill, power failure during operation is not dangerous as the moving belt on the treadmill will slowly stop. However, should the treadmill suddenly re-start, with the speed control set in a high speed position, the user of the equipment could be thrown from the treadmill, with the possibility of sustaining serious injury. Similar considerations are, of course, present in any piece of machinery, or equipment, powered by a d.c. motor, wherein an unexpected high speed start could damage both equipment and operating personnel.

It is, therefore, an object of the instant invention to provide a motor control circuit for a d.c. motor, which provides line dropout protection.

It is a further object of one embodiment of the instant invention to provide a line dropout circuit for a d.c. motor, which will prevent operation of the motor when power is applied, unless the main speed control is in a zero position.

It is another object of a second embodiment of the instant invention to provide a line dropout circuit for a d.c. motor, which will prevent excessive acceleration of the motor when power is applied.

It is a still further and general object of the instant invention to provide an inexpensive, yet highly reliable, d.c. motor control circuit with line dropout protection.

SUMMARY OF THE INVENTION

It is an aspect and feature of the instant invention that line dropout protection is provided, so that operation of a d.c. motor is prevented if power is applied at a time when a motor speed control device is not set in a zero position.

It is a feature of the invention that the motor speed control device is adjustable from a zero setting position to a maximum setting position, and first and second signals are produced in response to the position of said motor speed control device.

It is a further feature of the invention that a first signal is produced in response to the motor speed control device being set in the zero position, and a second signal is produced in response to the motor speed control device being placed in any position other than the zero setting position.

It is a still further feature of the invention that control circuits are responsive to the presence of the second signal at a time when power is being applied to the d.c. motor for preventing operation of the motor.

It is a still further feature and aspect of the invention that d.c. motor operation is re-enabled in response to the occurrence of the first signal.

It is still another feature and aspect of the instant invention that acceleration of a d.c. motor is controlled, such that unwanted excess acceleration is prevented when applying power to the d.c. motor.

The foregoing and other objects and features of this invention will be more fully understood from the following description of an illustrative embodiment thereof, taken in conjunction with the accompanying drawings.

DETAILED DESCRIPTION OF THE INVENTION

Figure 1:
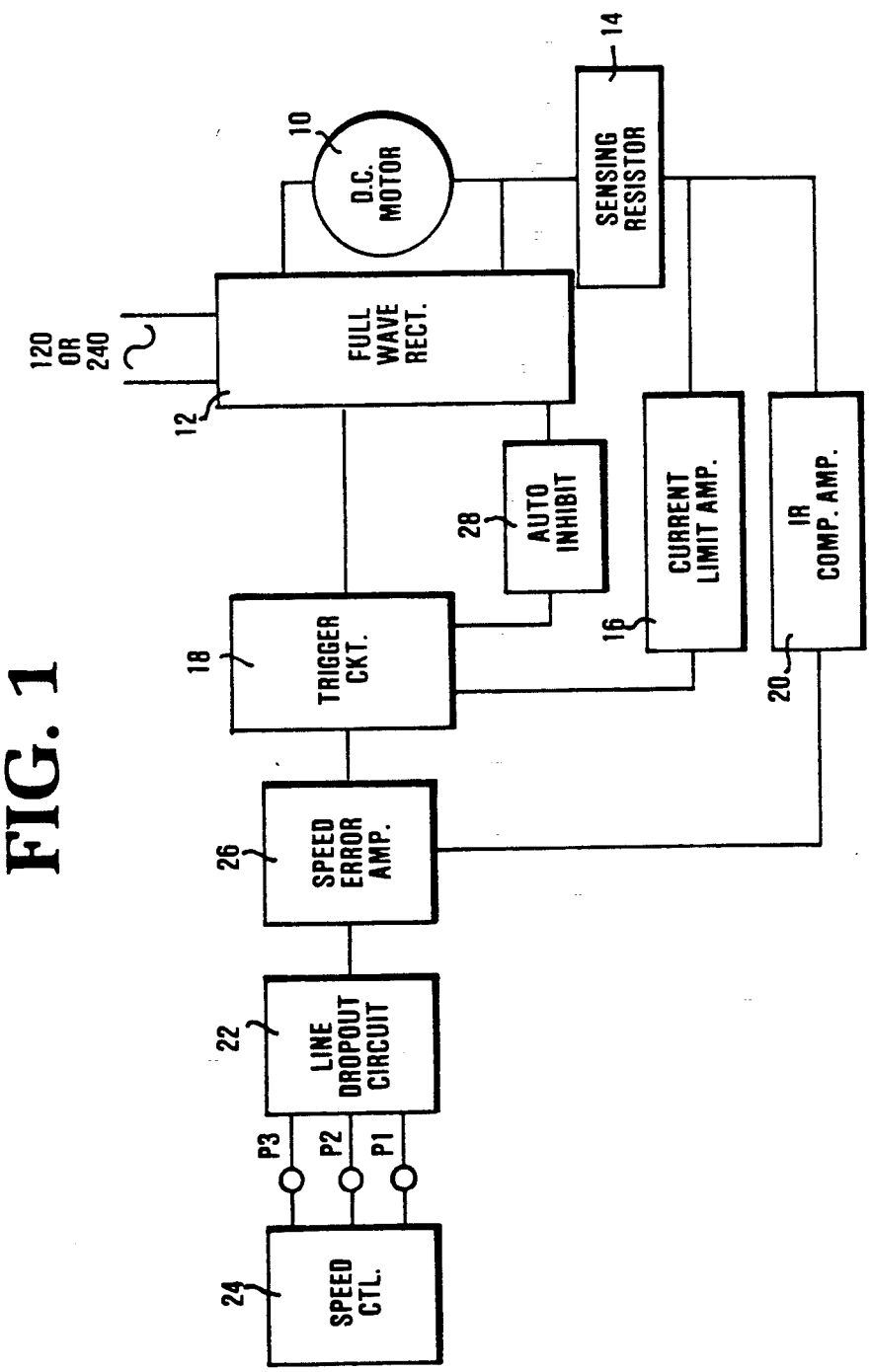
FIG. 1 is a block diagram of the preferred embodiment of the present invention.

The block diagram of FIG. 1 illustrates the general arrangement of circuitry for controlling the speed of a d.c. motor 10, and for providing current limit control thereto, and for providing line dropout protection. A full wave rectifying circuit 12 having an a.c. input of either 120 volts, or 240 volts, serves as the power supply to the motor. A motor sensing device 14, in the form of a resistor, is arranged to sense the voltage across the armature of the motor 10. The sensed voltage is fed and integrated into an amplifier circuit 16 for current limiting purposes. Within the amplifier circuit 16, the upper limit set point for motor current is established. Upon activation of the circuit 16 (when the motor current is above the set point), a resultant signal is conducted to a trigger circuit 18 for the rectifying circuit 12, thereby energizing the motor 10 in accordance with the desired current limiting conditions.

The voltage drop from the sensing resistor 14 is also conducted to a current/resistance (IR) compensating circuit 20, which serves to compensate for the inherent internal resistance of the motor armature in accordance with varying loads on the motor. A speed error amplifier 26 receives an error signal across the output of the controlling circuitry for the motor 10 in order to maintain speed according to desired speed settings.

Integrated into the system illustrated in FIG. 1 is line dropout circuit 22. The purpose of the line dropout circuit is to prevent the motor control circuit from turning on when power is applied, unless main speed control 24 is set in a zero position. Power application, when the speed control is not in a zero position, can happen if a line failure occurs, or the power is turned off while the motor is running at a preset speed and, thereafter, power is reapplied.

A speed error amplifier 26 is interposed between the line dropout circuit 22 and the trigger circuit 18 adding voltage to the operator induced voltage to compensate for internal armature resistance. Finally, the system of FIG. 1 includes an automatic inhibit circuit 28, which automatically inhibits the current control of the motor in the event there is a sudden drop in the input power to the power supply for the motor 10, and quick return of full input power occurs while motor charging capacitors have not been fully discharged.

Figure 2A:
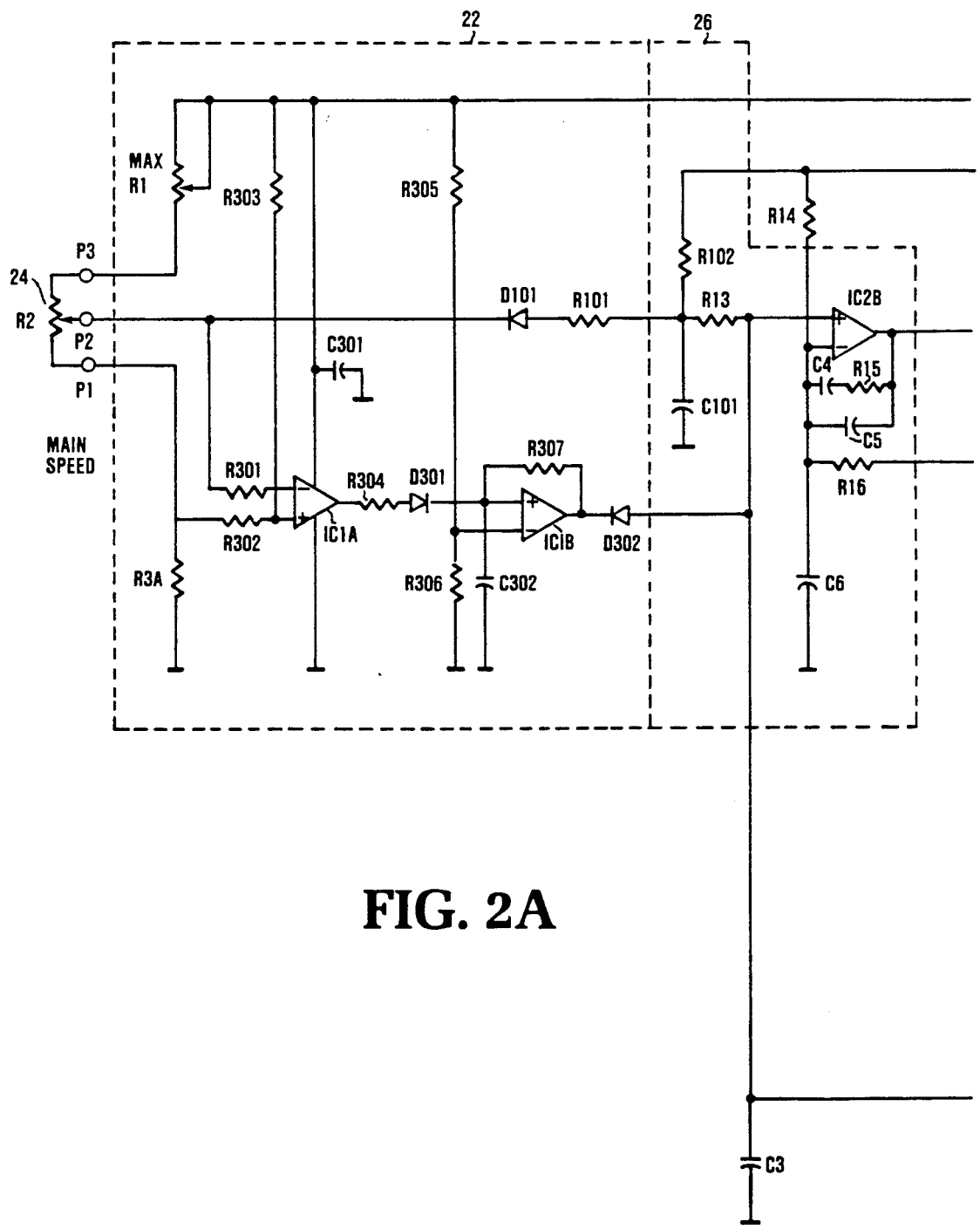
FIGS. 2A, 2B and 2C are schematic diagrams of an overall motor control system incorporating a first embodiment of line dropout protection.
Figure 2B:
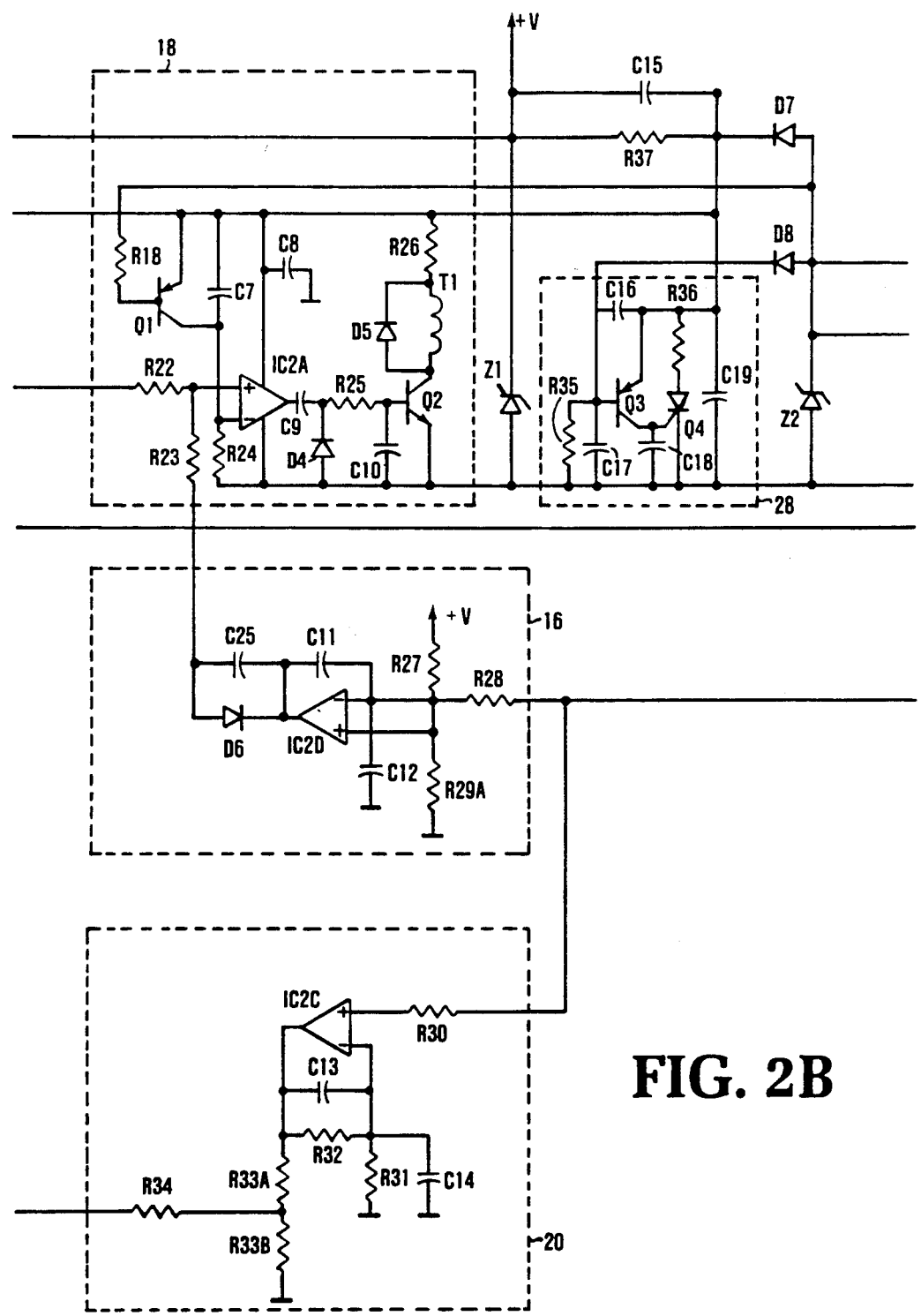
Figure 2C:
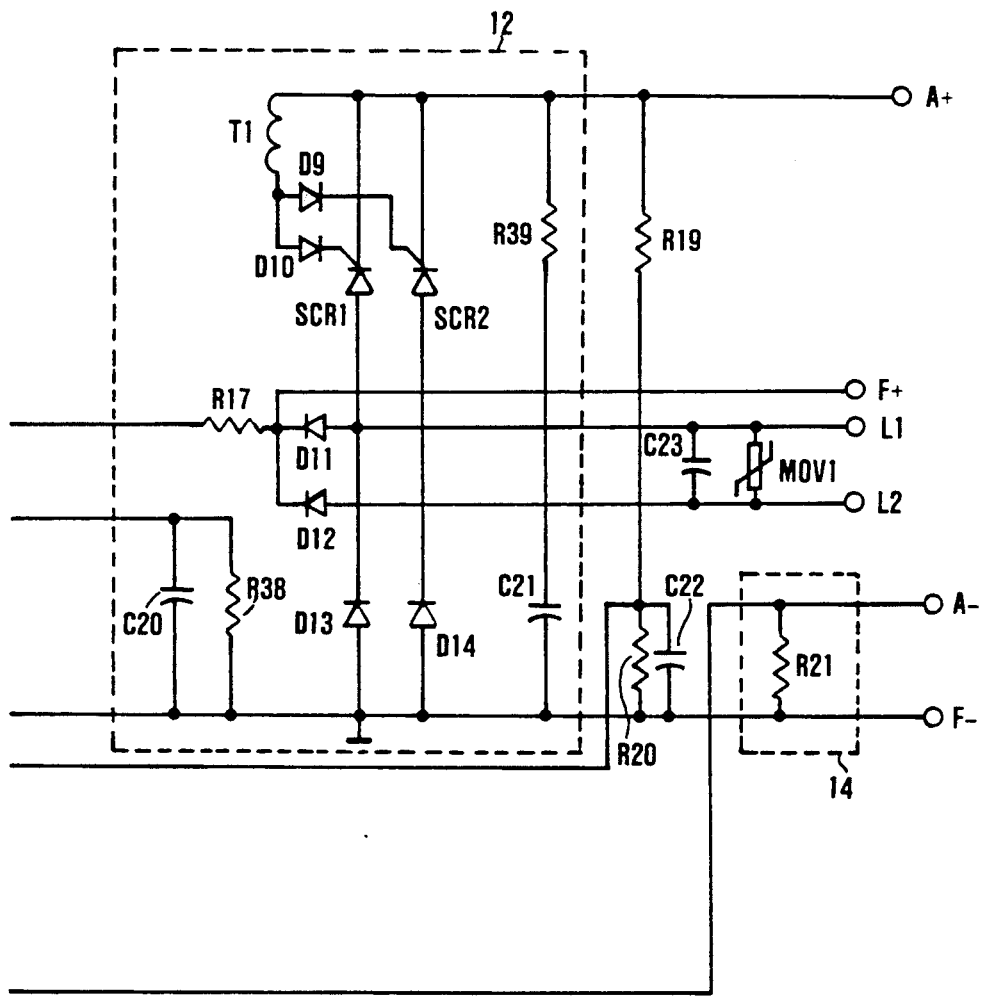

For a more detailed description of the circuitry embodying the present invention, the circuit diagram of FIGS. 2A-2C illustrate specific embodiments thereof.

As shown in FIG. 2C, the armature for the motor 10 is adapted to be energized directly by the full wave bridge circuit 12, which includes a pair of silicon controlled rectifiers SCR1 and SCR2, one in each of the input legs of the bridge circuit, diodes D13 and D14 in the other legs of the bridge, and resistor R39 and capacitor C21, functioning as a snubbing circuit. A.C. input of either 120 v or 240 v is brought into the bridge circuit by way of terminals L1, L2. The output of the bridge circuit is connected to the armature of the motor 10 by way of terminals A+ and A−, and the field coil of the motor is connected to the terminals F+ and F−. Components MOV1 and C23 provide filtering, transformer T1 is part of the SCR firing circuit and resistors R19 and R20 are a voltage divider network with C22 providing filtering.

A current sensing resistor R21 is connected to the armature of the motor between terminals A− and F−. This resistor, (sensing device 14 in FIG. 1), serves to sense the current through the armature and develops a voltage proportional to the current. As an example, if the motor 10 develops 1 hp by drawing 10 amps d.c. at full load, approximately 100 millivolts is produced across the resistor R21. This voltage is fed into the two operative amplifiers: the current limiting circuit 16, and the current/resistance compensating circuit 20.

The signal developed in the resistor R21, which is indicative of the voltage drop across the armature of the motor under various loading conditions, is utilized to provide compensating voltage for that lost by virtue of the internal resistance of the armature. This voltage is added to the voltage, which is normally impressed upon the motor for speed control during normal operation of the motor so that the motor is always induced with the proper voltage level indicative of operator demand. For example, it will be assumed the motor 10 is a one horsepower motor, has a 10 amp. rating, and with energization by 100 volts it will provide 2000 rpm. If the voltage is reduced 50 volts, it will produce 1000 rpm. However, when the motor begins to experience a load from 0 amps current to 10 amps, for example, a voltage drop appears across the armature. Assuming the internal resistance of the armature is one 0 hm at 10 amps, there will be a 10 volt drop across the armature. A nominal 50 volt input to the motor will, in effect, result only in the motor receiving 40 volts. Since in a d.c. motor, speed is proportional to voltage, the motor will develop only 800 rpm.

The compensating circuit 20 will produce the needed 10 volts, which can be pre-set when the motor load is to draw 10 amps, and to add this voltage to the speed amplifier circuit 26, as will be discussed below. The circuit 20 is linear, so that at 5 amps it will produce 5 volts and at 2½ amps, it will produce 2½ volts. In operation, then, in the example above, if 50 volts is normally induced into the motor, the control system will actually impress a total of 60 volts upon the motor.

The voltage drop signal produced by the resistor R21 will also be conducted to the current limiting circuit 16, where it is amplified by amplifier IC2D. The amplified signal is directed to a high gain comparator consisting of the device IC2A in the trigger circuit 18, as one of its inputs.

In circuit 16, resistors R27 and R29A form a voltage divider network, which sets a permanent threshold level for the conduction point of amplifier IC2D. Capacitor C12 acts as a noise capacitor. When the voltage increases across the resistor R21, which is an indication the current is increasing through the motor 10, a threshold is reached in IC2D, and when the voltage across the resistor R21 reaches the level pre-set by the input voltage divider network, (R27, R29A), the amplifier IC2D starts to conduct.

The amplified signal from IC2D is conducted to the input side of the device IC2A in the trigger circuit 18, via resistor 23. As the amplifier IC2D starts to conduct, it pulls the input to the comparator of IC2A to zero when the reference point of the amplifier IC2D is reached.

In the operation of the current limiting circuit 16, the parameters for the above-described example will be utilized. For the 10 amp motor, a threshold in R27/R29A is set with current limits of 15 amps. The current limiting circuit will not operate until the current starts to approach approximately 14.8–14.9 amps, and upon reaching 15 amps, the threshold of comparator IC2D starts to conduct, resulting in pulling of the signal away from resistor R22, whereupon IC2A levels off at the 15 amp level.

Normally, when the circuit limit is not reached, the output of IC2D is almost at full supply voltage of approximately +22 volts. Since the input of IC2A at the connection to resistor R22 never reaches this voltage, which is the control voltage for the comparator, the diode D6 is always reversed biased, the normal running condition of the system. Capacitors C11, C12 and C25 are noise capacitors. However, when the current in the motor reaches the pre-set threshold or current limit, the voltage at the output of the amplifier IC2D lowers and becomes lower than at the input of IC2A, resulting in the conduction of the diode D6. This, in turn, causes the pulling down of the input of IC2A from the resistor R22 and, consequently, the changes in phasing of IC2A. This change in phasing, at the output of the comparator IC2A, is transmitted to the firing gate electrodes of the silicon controlled rectifiers SCR1, SCR2, to cause firing thereof later in the input cycles therefor. In this manner, the output voltage of the bridge circuit 12 decreases, and the current to the motor also decreases to an appropriate amount. In a very heavy overload situation, the control decreases up to the point where current to the motor can go to zero.

The trigger circuit 18 includes transistors Q1 and Q2, which are adapted to change the phasing of the firing of the silicon controlled rectifiers SCR1 and SCR2. The transistor Q1 is used to synchronize the trigger with zero crossing voltage of the full wave rectified voltage on the sensor diode Z1, and the diode D7 serves as the isolation diode. As previously stated, the effect of changing of the phasing of IC2A is transmitted to the rectifiers SCR1, SCR2 for controlling the power input to the motor 10. The change in phasing by the transistors Q1 and Q2 is performed by way of the transformer T1, with the transistor Q2 actually serving as the firing component for the rectifiers SCR1 and SCR2 through the transformer. The remaining components shown in circuit 18, not specifically discussed, are standard bias, filtering and/or noise suppression components.

Operator control for the system of FIGS. 2A-2C is illustrated in FIG. 2 in the form of main speed control device 24, consisting of potentiometer R2. Device R2, when varied by an operator, sets up reference voltages which are applied to amplifier IC1A, which is part of the line dropout circuit described below.

The purpose of line dropout circuit 22 is to prevent operation of the motor control circuit should power be applied when potentiometer R2 is not set in the zero position. More particularly, IC1A and related components R301, R302, R303 form a DC-biased comparator, whose output will be "high" only if main speed potentiometer R2 is brought to zero position. A deviation, higher than a voltage threshold, determined by the ratio of R302 and R303, will cause the output of IC1A to be low.

IC1B and associated components C302, D301, R304, R305, R306, R307, form a latch circuit. If, at the moment of the application of AC power, main speed pot, R2, is at zero position, the output of IC1A is high and IC1B latches into a high output state through R304, D301 and R307. Thus, D302 becomes reverse biased because voltage at the intersection of D302, R13 and C3 is always lower than the saturation voltage of IC1B. IC1B does not interfere with the normal operation of the control circuit. If, however, AC power to the control circuit is applied while the main speed pot, R2, is in a position other than zero, then the outputs of IC1A and IC1B remain low, which clamps the "+" input of IC2B to low, which, in turn, turns the control off.

To reset the control circuit, it is necessary to rotate main speed pot, R2, to zero position. This brings the output of IC1A high, which causes IC1B to latch. Changing the position of R2 brings the output of IC1A to low, which has no effect on output of IC1B. The control circuit continues to operate with IC1B latched high, having no effect on operation. Components C101, D101, R101, R102 are provided to form a well known "Ramp-and-Pedestal" circuit to supply a control signal to input of Error Amplifier IC2B. C101 and R101 form an exponential acceleration circuit. Capacitor C25, together with resistor R22, forms a differentiator circuit which increases the dynamic response of the circuit when the control signal is applied to the positive input of amplifier IC2A.

As previously discussed, the compensating amplifier circuit 20 produces a signal indicative of the inherent internal resistance of the armature for the motor 10 for any load placed on the motor. This compensating signal is conducted by way of the resistor R34, to a junction between the resistor R13 and the voltage reference amplifier IC2B, which is in effect a speed error amplifier. This compensating signal, as fed by R34, is added to the command signal from line dropout circuit 22, which is fed through the resistor R13. This combined signal is transmitted to the motor supply circuit for energizing the motor in accordance with the instant invention.

In operation, the speed error amplifier IC2B takes the error signals between R13, which is the reference speed, and the feedback voltage developed between the resistors R19 and R20. The amplifier measures the voltage across the output of the motor control and compares it with the reference voltage established out of the potentiometer setting R2. During this action, the compensating network comprising IC2B, the capacitors C4, C5 and the resistor R15, serve to integrate and process the signal and enhance the frequency response of the control.

The automatic inhibit circuit 28 is actually a part of the supply circuitry for the motor 10. It is utilized to protect the motor from damage in the event the A.C. input is turned on and off very abruptly before the power supply capacitors have a chance to fully discharge. When A.C. is present in the circuit 12, the capacitor C18 is charged. When the A.C. is cut off, the transistor Q3 closes and discharges the voltage in C18 through the SCR switch Q4. Assuming the resistor R36 is one ohm, and the capacitor C19 is rated at 100 microfarad, the time constant for discharge of the capacitor C19 is 100 microseconds. This arrangement, in effect, brings the capacitor voltage of C19 from approximately 22 volts, down to one-half volt in half a millisecond.

The foregoing description of the control system for d.c. motor control utilizes a unique line dropout protection circuit for preventing motor start-up unless the motor speed control is in a zero position. This feature prevents motor start-up under unexpected conditions and greatly enhances safety to the operator.

Figure 3A:
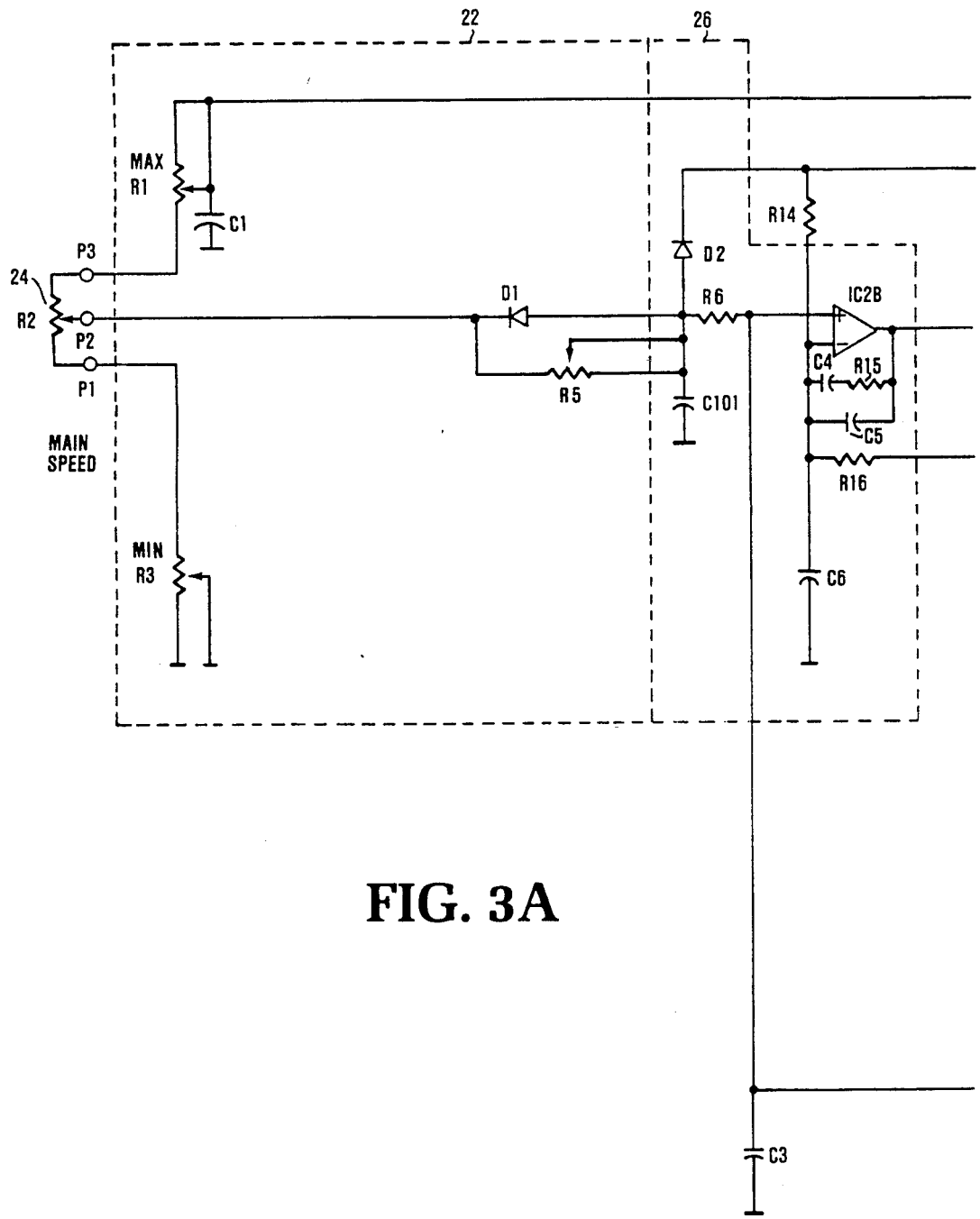
FIGS. 3A, 3B and 3C are schematic drawings of an overall motor control system incorporating a second embodiment of line dropout protection.
Figure 3B:
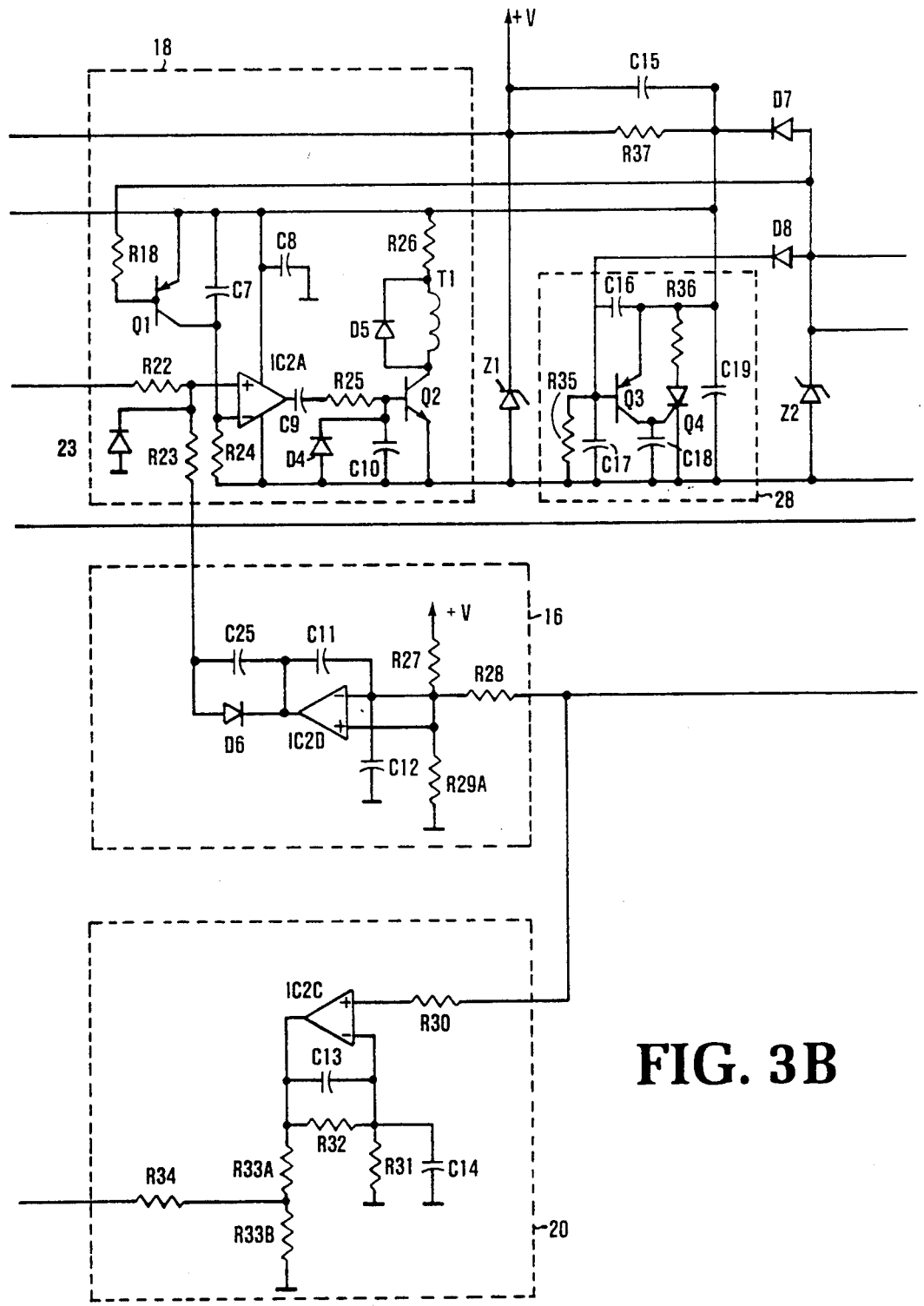
Figure 3C:
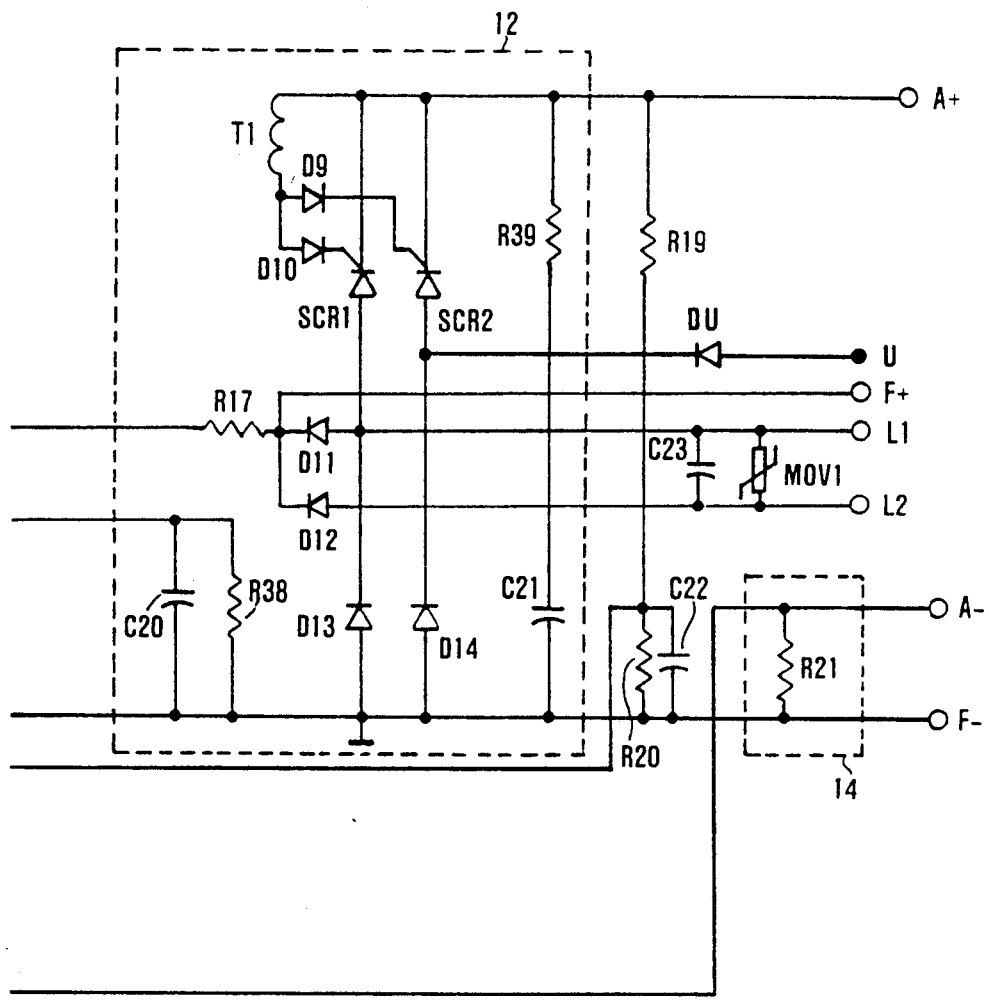

A second embodiment of the instant invention as disclosed in FIGS. 3A, 3B and 3C. Operation of a motor control circuit for a d.c. motor in accordance with the embodiment shown in FIGS. 3A-3C is very similar to the operation described above, except for the function of line dropout circuit 22.

More particularly, the embodiment described in FIGS. 2A-2C prevents operation of the attendant d.c. motor when power is applied, unless the main speed control was in a zero position. In contrast, the embodiment shown in FIGS. 3A-3C provides line dropout protection by preventing rapid acceleration of the d.c. motor when power is applied.

Referring to FIG. 3A, it is seen that this embodiment differs from the embodiment in FIG. 2A, primarily by the elimination of operational amplifiers IC1A and IC1B, along with their attendant biasing circuits. As recalled, the functions of amplifiers IC1A and IC1B are to provide a d.c. comparator, along with a latch circuit to prevent operation of the motor unless main speed control 24 is in a zero position. Those functions have been eliminated in the embodiment shown in FIGS. 3A-3C.

As alternative line dropout protection, potentiometer R5 has been added along with diodes D1, D2, resistors R6, R3 and capacitor C1. The function of resistor R5, in conjunction with capacitor C101, is to translate the step voltage applied to terminal P2 into a ramp voltage applied to the positive input of amplifier IC2B. The slope of the ramp applied to amplifier IC2B is dependent upon the setting of potentiometer R5. Accordingly, application of power to the motor control circuit will not result in rapid acceleration of the attendant d.c. motor unless potentiometer R5 is improperly set.

Proper adjustment of potentiometer R5 will reduce the slope of the ramp applied to the input of amplifier IC2B, and prevent undue acceleration of the d.c. motor.

Diode D1 can be optionally added to the circuit as shown, if control of rapid deceleration is not desired. Potentiometers R1 and R3 control maximum and minimum motor speed respectively.

The embodiment shown in FIGS. 3A-3C, also include minor modifications to the speed error amplifier, the trigger circuit and the full wave rectifier. More particularly, diode D2, has replaced resistor R102 in the speed error amplifier 26. Diode D2, together with resistor R6 and transistor Q4, create a discharge path for capacitor 101 when the a.c. power is disconnected from the motor control circuitry.

Referring now to FIG. 3B, it can be seen that zenar diode Z3 has been added, which clamps the voltage at the input terminal of comparator IC2A to a preset voltage, thereby preventing the firing angle from decreasing to zero degrees. This prevents erratic operation of the motor control circuit at top speeds, thereby permitting higher speeds to be achieved with stable operation of the control circuitry.

In addition, the cathode connection for diode D4 has been moved from the interconnection of capacitor C9, and resistor R25, to the interconnection of resistor R25 and capacitor C10. This modification serves to reduce the load on the operational amplifier IC2A.

Finally, referring to FIG. 2C, there has been added a diode DU along with a U terminal. This modification enables the control circuit to power series field d.c. motors with high efficiency.

From the foregoing, it will be apparent that the present invention provides d.c. motor speed control, which is most responsive to operator demands, both as to preciseness and to timeliness. For application machines which utilize large sized d.c. motors, the present invention is particularly adapted to provide a drive which can be accurately applied in a very precise and timely manner, while providing the extra safety feature of line dropout protection.

While the present invention is particularly adapted with respect to the circuitry disclosed, it is not to be considered as confined to the details set forth, but is intended to cover such modification, or changes, as may come within the scope of the following claims. For example, the trigger circuit 18 may utilize uninjunction transistors, programmable uninjunction transistors, or combinations of other transistors.

I claim:

1. A control circuit for controlling the operation of a d.c. motor comprising:
   means adjustable by an operator for establishing motor speed, said establishing means being adjustable from a zero setting position to a maximum setting position,
   means for monitoring an output of said establishing means and for producing a first signal in response to said establishing means being in said zero setting position, and a second signal in response to said establishing means being in any position other than said zero setting position, and
   means responsive to the presence of said second signal at a time when power is being applied to said d.c. motor for preventing operation of said d.c. motor, said preventing means including means responsive to the occurrence of said first signal for re-enabling operation of said d.c. motor, and said monitoring and producing means including comparator means for comparing the voltage level of electrical signals generated by said establishing means.

2. A control circuit in accordance with claim 1, wherein said preventing means includes latch means responsive to said comparator means for preventing operation of said d.c. motor.

3. A control circuit in accordance with claim 2, wherein said establishing means includes a potentiometer.

* * * * *